(12) United States Patent
Kobayashi

(10) Patent No.: US 10,205,613 B2
(45) Date of Patent: Feb. 12, 2019

(54) DATA RELAYING APPARATUS AND METHOD OF RELAYING DATA

(71) Applicant: FUJITSU LIMITED, Kawasaki-shi, Kanagawa (JP)

(72) Inventor: Ryu Kobayashi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 15/419,176

(22) Filed: Jan. 30, 2017

(65) Prior Publication Data

US 2017/0257236 A1 Sep. 7, 2017

(30) Foreign Application Priority Data

Mar. 3, 2016 (JP) .................. 2016-040901

(51) Int. Cl.
| | |
|---|---|
| *H04L 12/46* | (2006.01) |
| *H04L 12/70* | (2013.01) |
| *H04L 25/20* | (2006.01) |
| *H04L 29/06* | (2006.01) |
| *H04L 12/701* | (2013.01) |
| *H04L 12/707* | (2013.01) |

(Continued)

(52) U.S. Cl.
CPC ............. *H04L 25/20* (2013.01); *H04L 45/00* (2013.01); *H04L 69/22* (2013.01); *H04L 12/4633* (2013.01); *H04L 12/4641* (2013.01); *H04L 45/04* (2013.01); *H04L 45/24* (2013.01); *H04L 45/46* (2013.01); *H04L 45/66* (2013.01); *H04L 45/74* (2013.01); *H04L 45/745* (2013.01); *H04L 69/18* (2013.01); *H04L 2012/5652* (2013.01)

(58) Field of Classification Search
CPC ......... H04L 25/20; H04L 45/00; H04L 69/22; H04L 12/4633; H04L 69/18; H04L 12/4641; H04L 45/46; H04L 45/04; H04L 45/74; H04L 45/745; H04L 45/24; H04L 45/66; H04L 2012/5652
See application file for complete search history.

(56) References Cited

U.S. PATENT DOCUMENTS 9,847,933 B2 * 12/2017 Decusatis ............... H04L 45/24
2014/0241364 A1 * 8/2014 Raman .................. H04L 45/745
370/392

(Continued)

FOREIGN PATENT DOCUMENTS

| | | |
|---|---|---|
| JP | 2014-502126 | 1/2014 |
| WO | WO 2012/094216 A1 | 7/2012 |

*Primary Examiner* — Brian T O Connor
(74) *Attorney, Agent, or Firm* — Staas & Halsey LLP

(57) ABSTRACT

A data relaying apparatus includes a first input port, a first output port, and a processor configured to select, based on a destination of a data frame received by the first input port, one of a first process and a second process, the first process including removing first header information of the data frame and transmitting, to the first output port, the data frame from which the first header information is removed, and the second process including adding second header information to the data frame received by the first input port and transmitting, to the first output port, the data frame to which the second header information is added, and perform the selected one of the first process and the second process on the data frame received by the first input port, wherein the first output port outputs the data frame for which the selected process is performed.

10 Claims, 17 Drawing Sheets

(51) Int. Cl.
*H04L 12/715* (2013.01)
*H04L 12/721* (2013.01)
*H04L 12/741* (2013.01)

(56) References Cited

U.S. PATENT DOCUMENTS

| | | | |
|---|---|---|---|
| 2015/0016462 A1* | 1/2015 | Zhou | H04L 12/4633 370/392 |
| 2015/0092602 A1* | 4/2015 | Hao | H04L 12/462 370/254 |
| 2015/0222533 A1* | 8/2015 | Birrittella | H04L 45/66 370/392 |
| 2016/0134563 A1* | 5/2016 | Yu | H04L 12/4625 370/390 |
| 2016/0330141 A1* | 11/2016 | Vobbilisetty | H04L 45/583 |
| 2017/0331640 A1* | 11/2017 | Hao | H04L 12/462 |
| 2018/0013679 A1* | 1/2018 | Zhang | H04L 47/125 |

* cited by examiner

DATA RELAYING APPARATUS AND METHOD OF RELAYING DATA

CROSS-REFERENCE TO RELATED APPLICATION

This application is based upon and claims the benefit of priority of the prior Japanese Patent Application No. 2016-040901, filed on Mar. 3, 2016, the entire contents of which are incorporated herein by reference.

FIELD

The present embodiments relate to a data relaying apparatus and a method of relaying data.

BACKGROUND

For example, in order to improve the band use efficiency or the communication path switching performance when a failure occurs, transparent interconnection of lots of links (TRILL) and shortest path bridging (SPB) have been devised newly as routing protocols. Each of TRILL and SPB may be used as a multi-way communication path and allows high speed switching when a failure occurs. Since, in TRILL or SPB, all network (NW) apparatus such as data relaying apparatus in the network incorporate the same protocol, in an urban area or at an important base, a communication path for the third way or the fourth way may be secured and communication having high reliability may be implemented.

On the other hand, at a deserted place, the main function may be required for a NW apparatus is a packet relaying function, and the switching function among three ways or four ways may not be required. However, in order to secure the coexistence of a NW at a deserted place with a NW in an urban area, also at the deserted place, NW apparatus that incorporate such a protocol as TRILL or SPB are installed. Therefore, the cost increases.

Thus, if the compatibility of a protocol may be secured between TRILL/SPB and Ethernet (registered trademark), a communication NW having high reliability may be implemented at a low cost. As a related art, there is Japanese National Publication of International Patent Application No. 2014-502126.

SUMMARY

According to an aspect of the embodiments, a data relaying apparatus includes a first input port, a first output port, a memory and a processor coupled to the memory and configured to select, based on a destination of a data frame received by the first input port, one of a first process and a second process, the first process including removing first header information of the data frame and transmitting, to the first output port, the data frame from which the first header information is removed, and the second process including adding second header information to the data frame received by the first input port and transmitting, to the first output port, the data frame to which the second header information is added, and perform the selected one of the first process and the second process on the data frame received by the first input port, wherein the first output port is configured to output the data frame for which the selected process is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Between TRILL and Ethernet or between SPB and Ethernet, many additional functions or components may be required in order to secure the compatibility between the different protocols, and therefore, the merits of coexistence of different protocols degrade. In short, it is the actual situation that, between TRILL and Ethernet, between SPB and Ethernet or the like at present, the compatibility between the different protocols is not yet assured successfully. Therefore, a system is demanded which may secure the compatibility between protocols different from each other with an additional cost suppressed while an existing switching function is used.

In the following, working examples of a data relaying apparatus and a data relaying method disclosed in the present application are described in detail with reference to the drawings. It is to be noted, however, that the disclosed technology shall not be restricted by the working examples. Further, the working examples described below may be combined suitably within a range within which no conflict is caused.

Working Example 1

Figure 1:
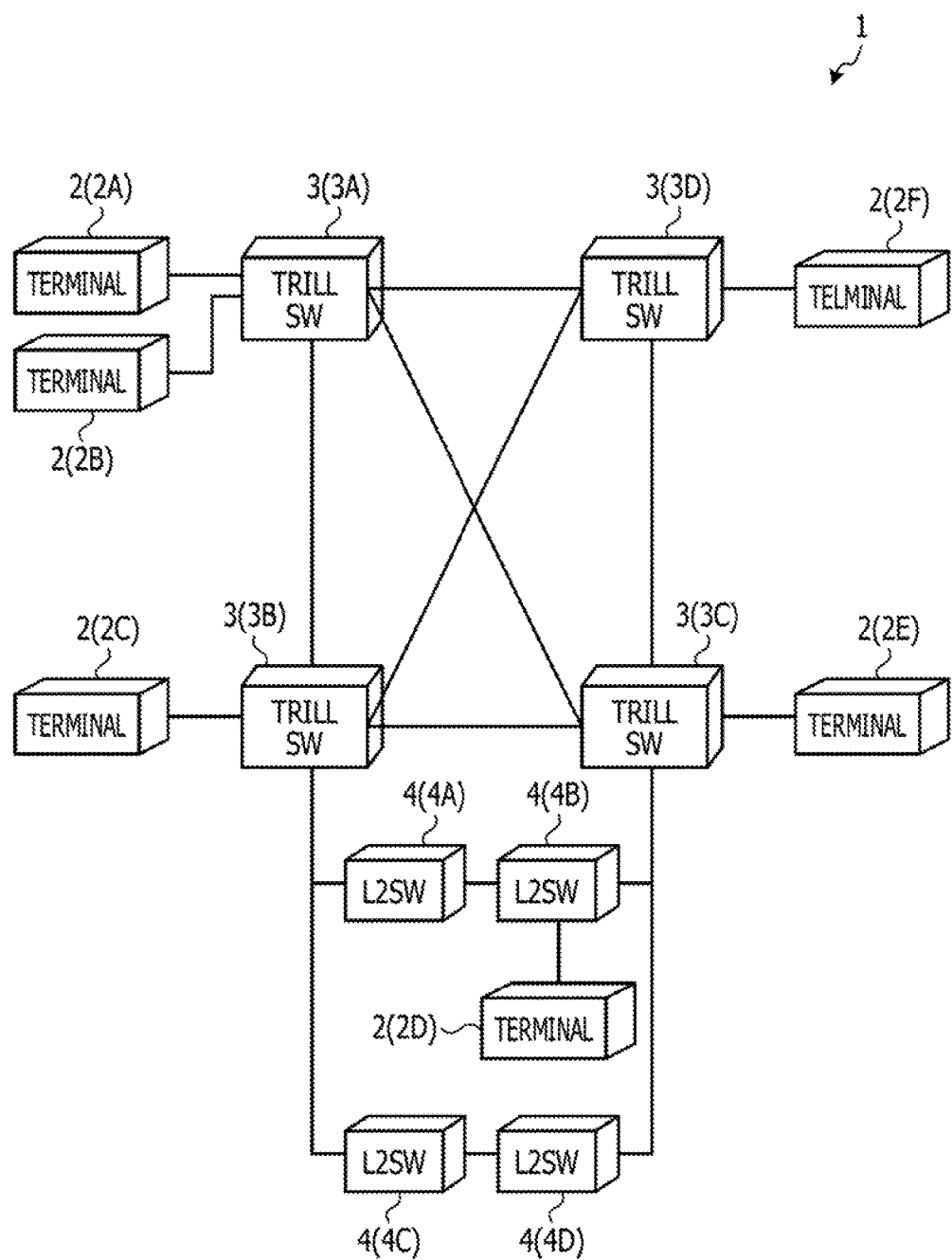
FIG. 1 is an explanatory view depicting an example of a data relaying system of a working example 1.

FIG. 1 is an explanatory view depicting an example of a data relaying system 1 of a working example 1. The data relaying system 1 depicted in FIG. 1 includes a plurality of terminals 2, a plurality of TRILL SWs 3, and a plurality of L2 SWs 4. Each TRILL SW 3 has a built-in multi-way switching function that couples to another TRILL SW 3 or another L2 SW 4 by a mesh configuration and relays a TRILL frame. Each L2 SW 4 has a built-in relaying communication function for two ways that couples, for example, to another L2 SW 4 or another TRILL SW 3 by an electric circuit or the like and relays an Ethernet frame. Each terminal 2 is a communication apparatus of a user. It is to be noted that, for the convenience of description, it is assumed the number of TRILL SWs 3 is, for example, four including TRILL SWs 3A to 3D, and the number of L2 SWs 4 is, for example, four including L2 SWs 4A to 4D. It is assumed that each TRILL SW 3 in the data relaying system 1 is disposed, for example, in an urban area while each L2 SW 4 is disposed at a deserted place such as in a remote island, in a mountainous region or the like.

The TRILL SW 3A accommodates and couples to, for example, the terminals 2A and 2B. The TRILL SW 3B accommodates and couples to, for example, the terminal 2C. The TRILL SW 3C accommodates and couples to, for example, the terminal 2E. The TRILL SW 3D accommodates and couples to, for example, the terminal 2F.

Figure 2:
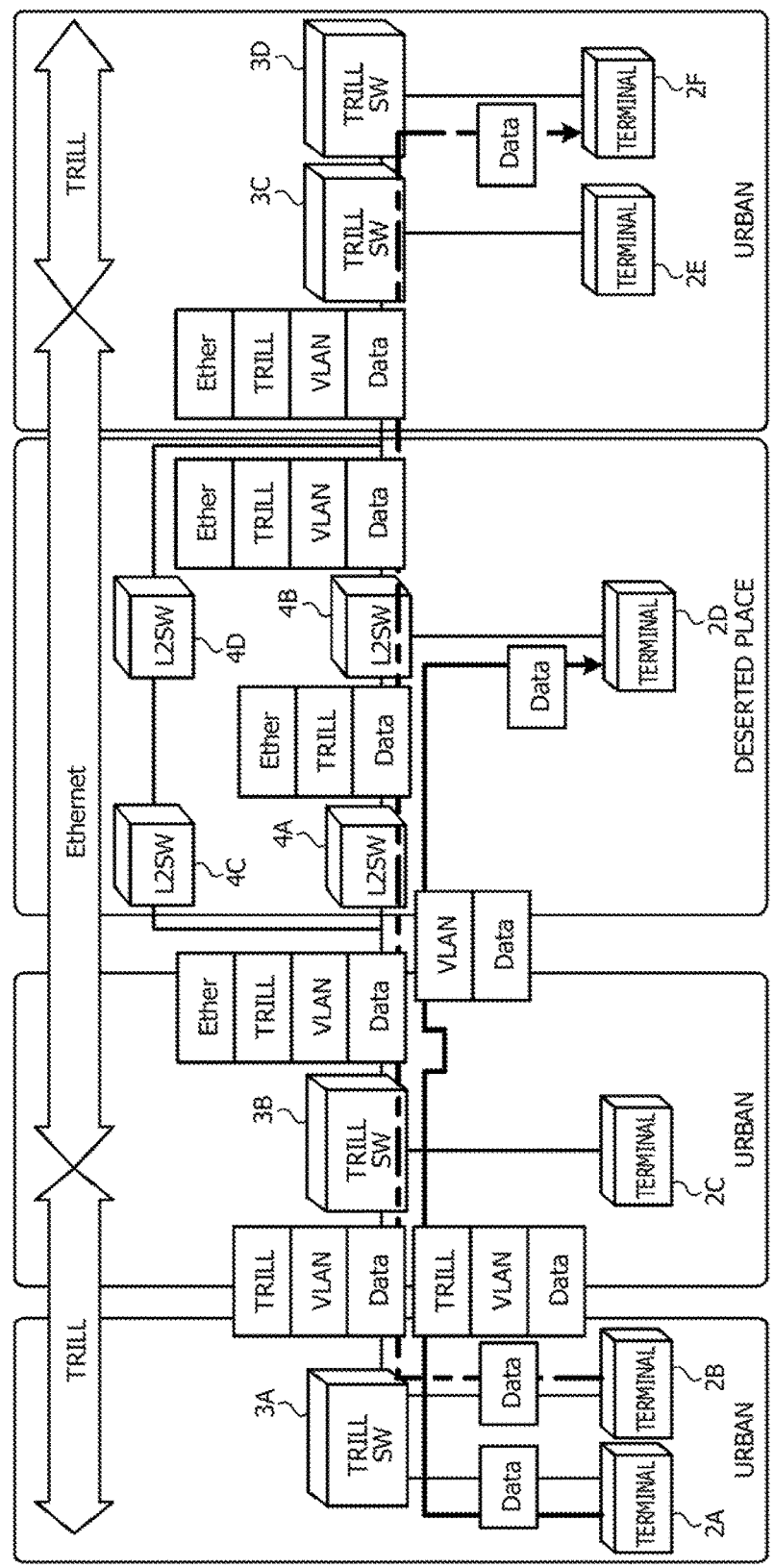
FIG. 2 is an explanatory view illustrating an example of a communication form between terminals in a data relaying system.

FIG. 2 is an explanatory view illustrating an example of a communication form between terminals 2 in the data relaying system 1. In the data relaying system 1 depicted in FIG. 2, the TRILL protocol is used for communication, for example, between the TRILL SW 3A and the TRILL SW 3B and between the TRILL SW 3C and the TRILL SW 3D. It is to be noted that the TRILL protocol is used for communication between TRILL SWs 3. In the data relaying system 1, the Ethernet protocol is used between the TRILL SW 3B, the L2 SW 4A, the L2 SW 4B, and the TRILL SW 3C and between the TRILL SW 3B, the L2 SW 4C, the L2 SW 4D, and the TRILL SW 3C.

In the data relaying system 1, when the terminal 2A transmits data to the terminal 2F, the data is relayed in order along the path of the TRILL SW 3A, the TRILL SW 3B, the L2 SW 4C, the L2 SW 4D, the TRILL SW 3C, and the TRILL SW 3D. In this case, the communication protocol changes in the order of TRILL, Ethernet, and TRILL.

In the data relaying system 1, when the terminal 2B transmits data to the terminal 2D, the data is relayed in the order of the TRILL SW 3A, the TRILL SW 3B, the L2 SW 4A, and the L2 SW 4B. In this case, the communication protocol changes in the order of TRILL and Ethernet.

Figure 3:
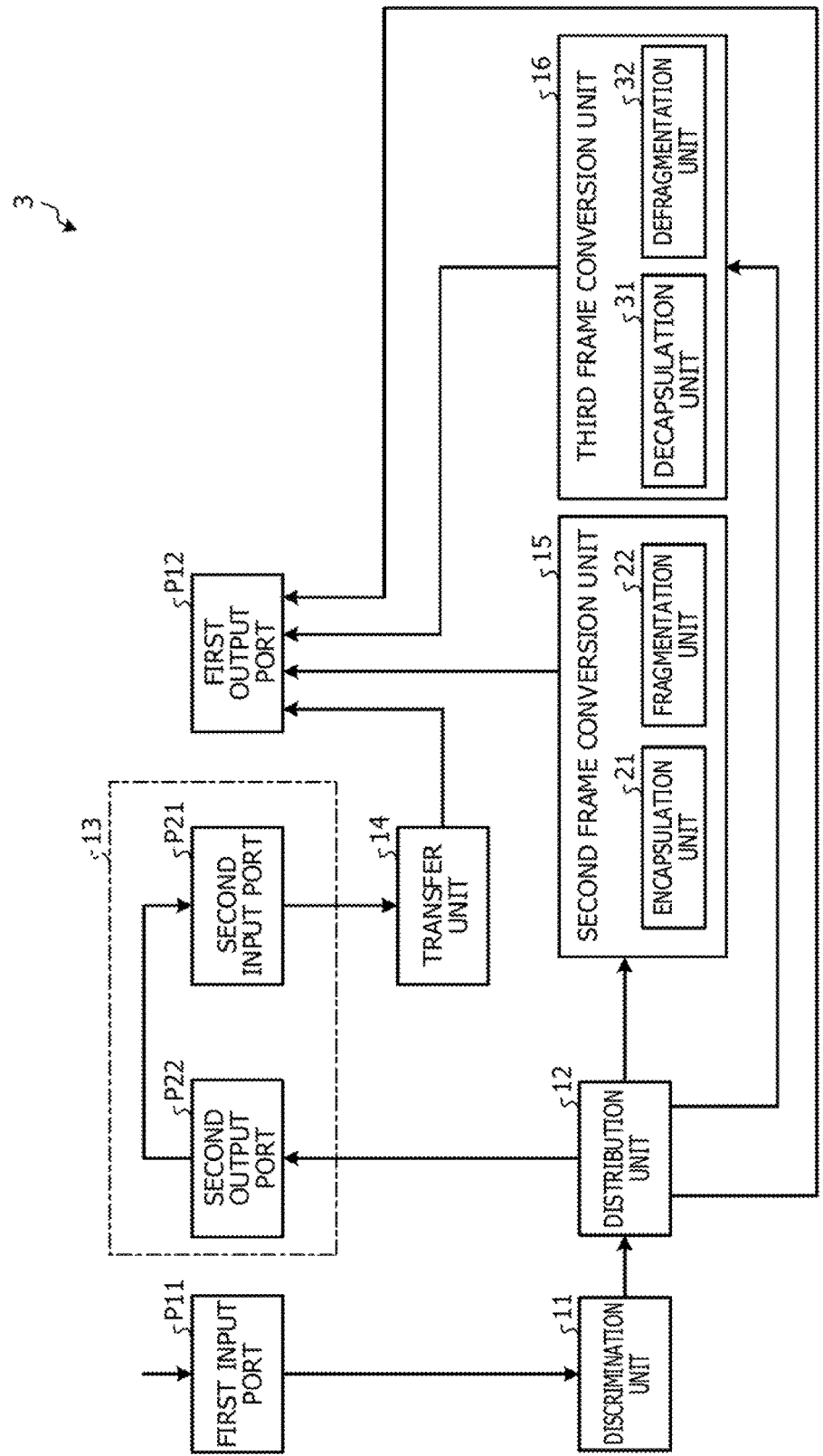
FIG. 3 is a block diagram depicting an example of a configuration of a TRILL SW.

FIG. 3 is a block diagram depicting an example of a configuration of each TRILL SW 3. The TRILL SW 3 depicted in FIG. 3 includes a first input port P11, a first output port P12, a second input port P21, and a second output port P22. The TRILL SW 3 further includes a discrimination unit 11, a distribution unit 12, a first frame conversion unit 13, a transfer unit 14, a second frame conversion unit 15, and a third frame conversion unit 16.

The discrimination unit 11 extracts destination information and header information in a received frame and discriminates a frame type based on the header information in the received frame. It is to be noted, as the frame type, there are an Ethernet frame 50, a TRILL frame 60, and a transmission type TRILL frame 70 hereinafter described.

Figure 4A:
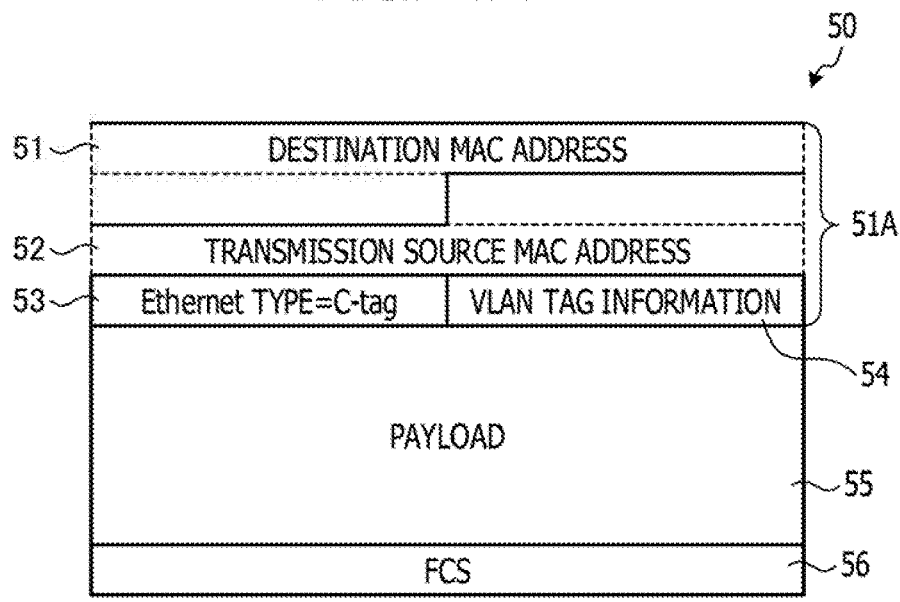
FIG. 4A is an explanatory view illustrating an example of a format configuration of an Ethernet frame.

FIG. 4A is an explanatory view illustrating an example of a format configuration of the Ethernet frame 50. The Ethernet frame 50 illustrated in FIG. 4A includes a destination media access control (MAC) address 51, a transmission source MAC address 52, an Ethernet type 53, virtual local area network (VLAN) tag information 54, a payload 55, and a frame check sequence (FCS) 56. The destination MAC address 51 is a region for storing a MAC address for identifying a destination of the frame. The transmission source MAC address 52 is a region for storing a MAC address for identifying a transmission source of the frame. The Ethernet type 53 is a region for storing an identifier for identifying a type of the frame. The VLAN tag information 54 is a region for storing an identifier for identifying a VLAN tag. The payload 55 is a region for storing data. The FCS 56 is a region for storing a check sum code for error detection and correction.

Figure 4B:
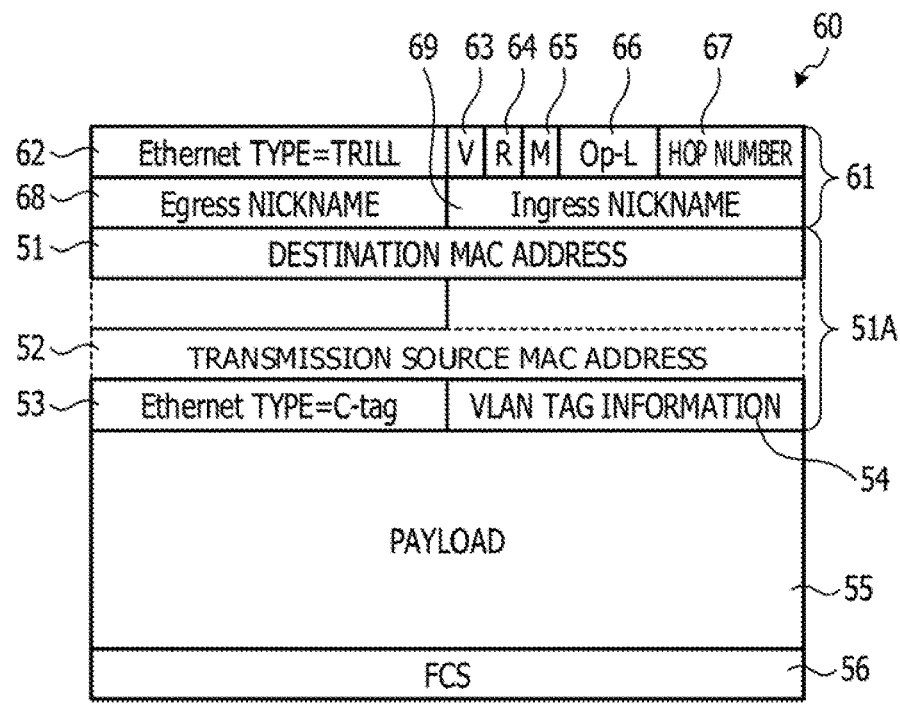
FIG. 4B is an explanatory view illustrating an example of a format configuration of a TRILL frame.

FIG. 4B is an explanatory view illustrating an example of a format configuration of the TRILL frame 60. The TRILL frame 60 illustrated in FIG. 4B is configured by adding a TRILL header 61 to the Ethernet frame 50. The TRILL header 61 includes an Ethernet type 62 for identifying TRILL, a TRILL version (V) 63, a reserve bit (R) 64, a multicast bit (M) 65, and an option field length (Op-L) 66. Further, the TRILL header 61 includes a hop number 67, an Egress nickname 68, and an Ingress nickname 69. The TRILL version (V) 63 is a region for storing an identifier for identifying a TRILL version of the frame. The reserve bit (R) 64 is a region for storing information indicative of a range of the hop number 67 of the frame. The multicast bit (M) 65 is a region for storing an identifier for identifying whether the frame is of the unicast type or the multicast type. The option field length (Op-L) 66 is a region for extension. The hop number 67 is a region for storing a hop number for identifying whether or not the frame is to be discarded. The Egress nickname 68 is a region for storing an identifier for identifying the RB of the Egress side. The Ingress nickname 69 is a region for storing an identifier for identifying the RB of the Ingress side.

Figure 5:
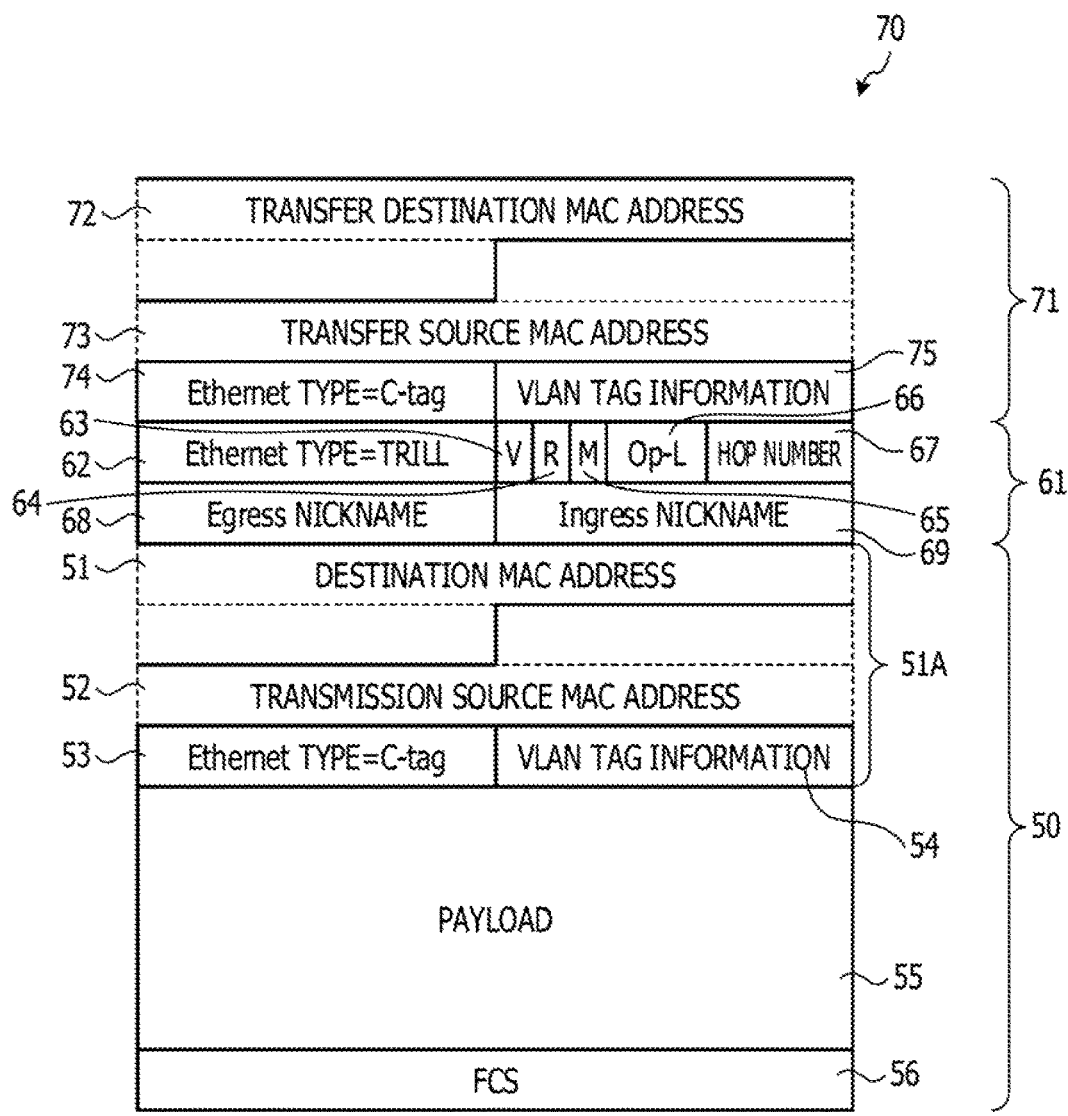
FIG. 5 is an explanatory view illustrating an example of a format configuration of a transmission type TRILL frame.

FIG. 5 is an explanatory view illustrating an example of a format configuration of the transmission type TRILL frame 70. The transmission type TRILL frame 70 illustrated in FIG. 5 is configured by adding an external Ethernet header 71 to the TRILL frame 60. The external Ethernet header 71 includes a transfer destination MAC address 72, a transfer source MAC address 73, an Ethernet type 74, and VLAN tag information 75. The transfer destination MAC address 72 is a region for storing a MAC address of the transfer destination of the frame. The transfer source MAC address 73 is a region for storing a MAC address of the transfer source of the frame. The VLAN tag information 75 is a region for storing a VLAN tag for exclusive use for TRILL data.

The distribution unit 12 distributes, if a received frame is a TRILL frame 60 without through the Ethernet based on a result of a discrimination by the discrimination unit 11, the TRILL frame 60 to the first output port P12. The distribution unit 12 distributes, if the received frame is a TRILL frame 60 destined for a terminal 2 subordinate to the Ethernet at the succeeding stage based on a result of the discrimination by the discrimination unit 11, the TRILL frame 60 to the second output port P22. The distribution unit 12 distributes, if the received frame is a TRILL frame 60 destined for a terminal 2 subordinate to the TRILL through the Ethernet based on a result of the discrimination by the discrimination unit 11, the TRILL frame 60 to the second frame conversion unit 15. The distribution unit 12 distributes, if the received frame is a transmission type TRILL frame 70 based on a result of the discrimination by the discrimination unit 11, the transmission type TRILL frame 70 to the third frame conversion unit 16.

The first frame conversion unit 13 converts a TRILL frame 60 into an Ethernet frame 50 by removing the TRILL header 61 in the TRILL frame 60. It is to be noted that the first frame conversion unit 13 is configured by coupling the second output port P22 and the second input port P21 to each other. The first frame conversion unit 13 outputs the received TRILL frame 60 from the second output port P22 to remove the TRILL header 61 from the TRILL frame 60 thereby to form an Ethernet frame 50. Further, the first frame conversion unit 13 inputs the Ethernet frame 50 after the removal of the TRILL header 61 outputted from the second output port P22 to the second input port P21 so as to transfer the Ethernet frame 50 to the transfer unit 14. The transfer unit 14 transfers the Ethernet frame 50 inputted from the second input port P21 to the first output port P12 so as to be outputted from the first output port P12.

The second frame conversion unit 15 encapsulates a TRILL frame 60 with the external Ethernet header 71 and fragments data of the payload of the TRILL frame 60 to convert the TRILL frame 60 into a transmission type TRILL frame 70. The second frame conversion unit 15 includes an encapsulation unit 21 and a fragmentation unit 22. The encapsulation unit 21 adds an external Ethernet header 71 to the TRILL frame 60 to generate a transmission type TRILL frame 70. It is to be noted that the frame length of the TRILL frame 60 sometimes becomes, for example, equal to or greater than 1524 bytes because the TRILL header 61 of the 24 bytes is added to the Ethernet frame 50.

The fragmentation unit 22 decides whether or not the frame length of the generated transmission type TRILL frame 70 exceeds a maximum transmission frame length of the L2 SW 4. It is to be noted that the maximum transmission frame length is 1500 bytes. The L2 SW 4 discards the received frame when the received frame has a length exceeding the maximum transmission frame length. When the frame length of the transmission type TRILL frame 70 does not exceed the maximum transmission frame length of the L2 SW 4, the fragmentation unit 22 outputs the transmission type TRILL frame 70 from the first output port P12. On the other hand, if the frame length of the transmission type TRILL frame 70 exceeds the maximum transmission frame length of the L2 SW 4, the fragmentation unit 22 divides the data of the payload 55 in the transmission type TRILL frame 70.

Figure 6:
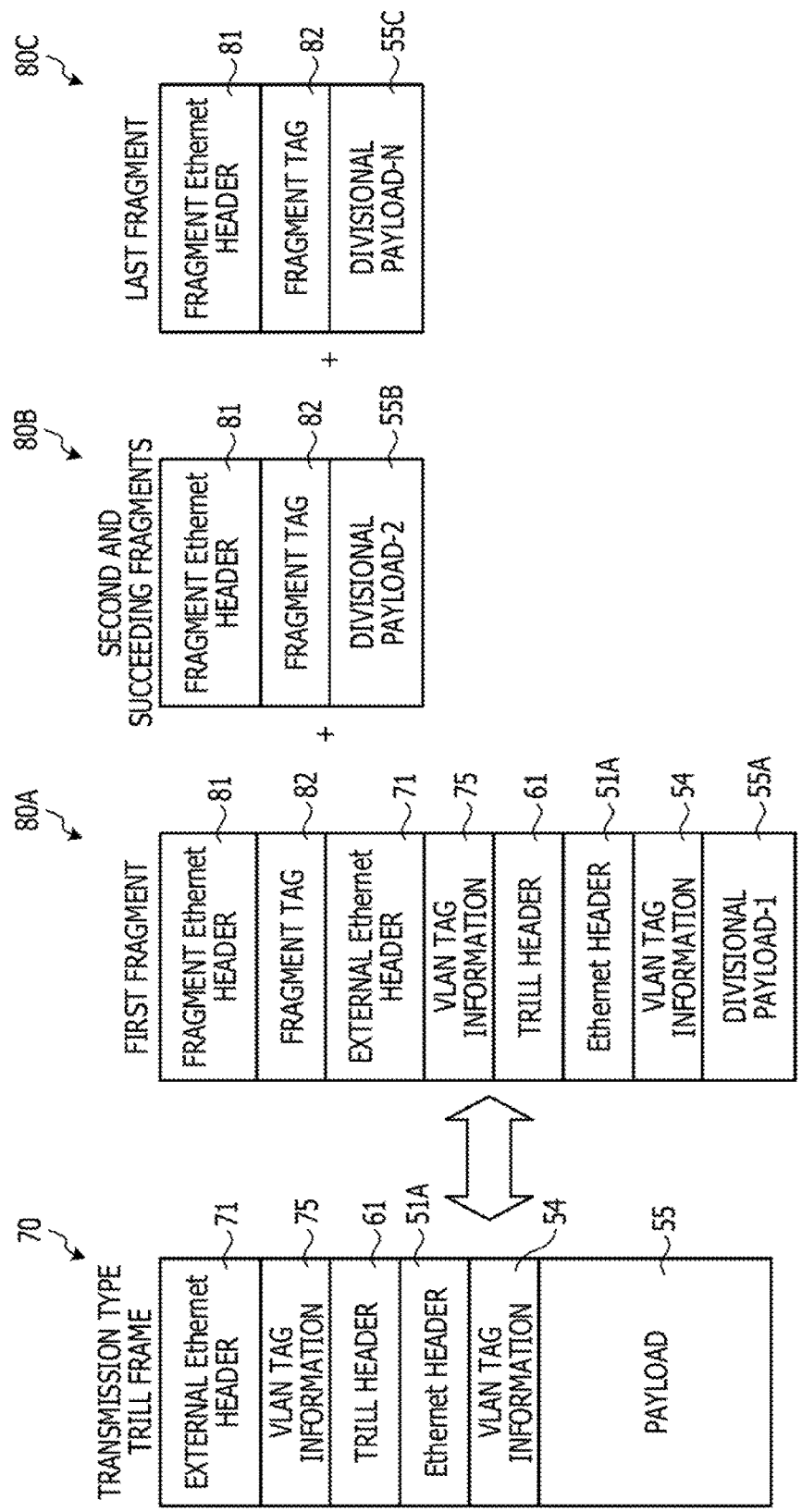
FIG. 6 is an explanatory view illustrating an example of a fragment process of a TRILL SW.

FIG. 6 is an explanatory view illustrating an example of operation of the fragmentation unit 22. The fragmentation unit 22 divides data in the payload 55 in the transmission type TRILL frame 70 into a plurality of fragments 80A to 80C. The first fragment 80A includes a fragment Ethernet header 81, a fragment tag 82, an external Ethernet header 71, and VLAN tag information 75. Further, the fragment 80A includes a TRILL header 61, an Ethernet header 51A, VLAN tag information 54, and a divisional payload 55A. The fragment Ethernet header 81 is a header for identifying that the fragment 80A is a fragment of a transmission type TRILL frame 70. The fragment tag 82 is a tag for identifying that the fragment 80A is a fragment of a transmission type TRILL frame 70 unit. The second and succeeding fragments 80B include a fragment Ethernet header 81, a fragment tag 82, and a divisional payload 55B. The last fragment 80C includes a fragment Ethernet header 81, a fragment tag 82, and a divisional payload 55C. It is to be noted that the fragment tag 82 in the fragments 80A to 80C is an identifier for identifying that the data is of the same payload.

The third frame conversion unit 16 removes the external Ethernet header 71 from the transmission type TRILL frame 70 and defragments the fragments of the transmission type TRILL frame 70 to convert the transmission type TRILL frame 70 into a TRILL frame 60. The third frame conversion unit 16 includes a decapsulation unit 31 and a defragmentation unit 32. The decapsulation unit 31 decapsulates the transmission type TRILL frame 70 to remove the external Ethernet header 71 from the transmission type TRILL frame 70. Further, the defragmentation unit 32 refers to the fragment tag 82 in the transmission type TRILL frame 70 to defragment the divisional payloads 55A to 55C of each of the fragments 80A to 80C. Then, the defragmentation unit 32 converts the transmission type TRILL frame 70 into a TRILL frame 60 by defragmenting each of the fragments 80A to 80C and outputs the TRILL frame 60 to the first output port P12.

Figure 7:
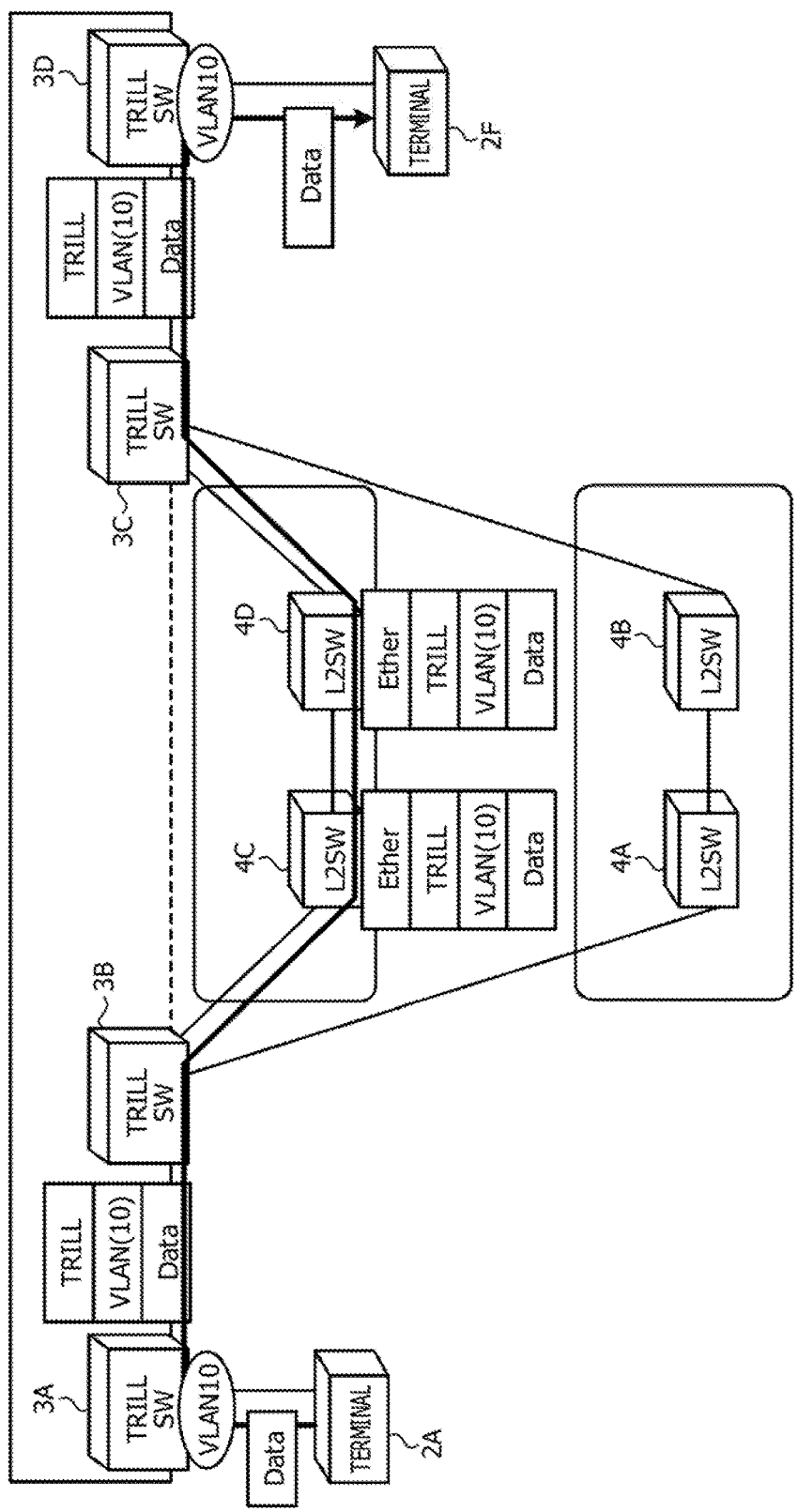
FIG. 7 is an explanatory view illustrating an example of a transmission type TRILL relaying process.

Next, operation of the data relaying system 1 of the working example 1 is described. FIG. 7 is an explanatory view illustrating an example of a transmission type TRILL relaying process. If the TRILL SW 3A depicted in FIG. 7 receives data destined for the terminal 2F from the terminal 2A, the TRILL SW 3A converts the data destined for the terminal 2F into a TRILL frame 60 and transmits the TRILL frame 60 to the TRILL SW 3B.

When the TRILL SW 3B receives the TRILL frame 60 destined for the terminal 2F, the TRILL SW 3B identifies, based on destination information in the TRILL frame 60, the TRILL frame 60 as a TRILL frame 60 that is to pass the L2 SWs 4A and 4B. As a result, the TRILL SW 3B encapsulates the TRILL frame 60 with an external Ethernet header 71 and fragments the data of the payload in the TRILL frame 60 to convert the TRILL frame 60 into a transmission type TRILL frame 70. Then, the TRILL SW 3B relays the transmission type TRILL frame 70 obtained by the conversion to the L2 SW 4C.

When the L2 SW 4C receives the transmission type TRILL frame 70, the L2 SW 4C relays the received transmission type TRILL frame 70 to the L2 SW 4D. Further, when the L2 SW 4D receives the transmission type TRILL frame 70, the L2 SW 4D relays the received transmission type TRILL frame 70 to the TRILL SW 3C.

Further, the TRILL SW 3C removes the external Ethernet header 71 in the received transmission type TRILL frame 70 and defragments the data of the fragments to covert the transmission type TRILL frame 70 into a TRILL frame 60. Then, when the TRILL SW 3C receives the TRILL frame 60, since the destination information in the TRILL frame 60 is the terminal 2F, the TRILL SW 3C removes the TRILL header 61 in the TRILL frame 60 and relays a resulting Ethernet frame 50 to the terminal 2F.

Figure 8:
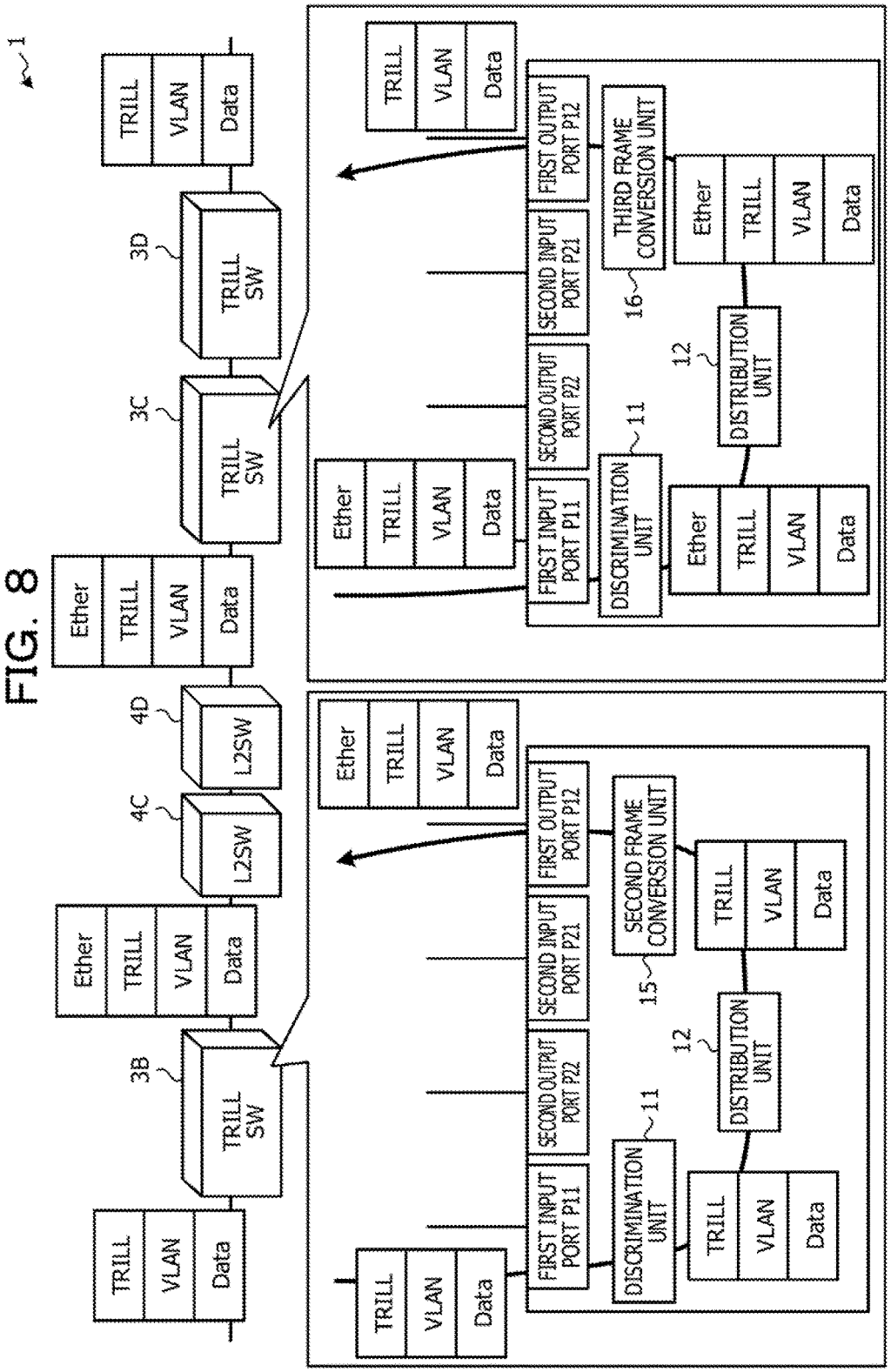
FIG. 8 is an explanatory view illustrating an example of operation in each TRILL SW relating to a transmission type TRILL relaying process.

FIG. 8 is an explanatory view illustrating an example of operation in the TRILL SWs 3B and 3C relating to a transmission type TRILL relaying process. If a TRILL frame 60 is received from the first input port P11, the discrimination unit 11 in the TRILL SW 3B depicted in FIG. 8 discriminates destination information in and a frame type of the received TRILL frame 60 and notifies the distribution unit 12 of a result of the discrimination. It is to be noted that it is assumed that the destination information is destined for the terminal 2F through the Ethernet. The distribution unit 12 distributes the TRILL frame 60 from the first input port P11 to the second frame conversion unit 15. The second frame conversion unit 15 encapsulates the TRILL frame 60 with the external Ethernet header 71 and fragments the data of the payload in the TRILL frame 60 to convert the TRILL frame 60 into a transmission type TRILL frame 70. Then, the second frame conversion unit 15 outputs the transmission type TRILL frame 70 from the first output port P12. As a result, the L2 SW 4 may relay the TRILL frame 60 using the transmission type TRILL frame 70.

Further, if a transmission type TRILL frame 70 is received from the first input port P11, the discrimination unit 11 in the TRILL SW 3C discriminates destination information in and a frame type of the received transmission type TRILL frame 70 and notifies the distribution unit 12 of a result of the discrimination. The distribution unit 12 distributes the transmission type TRILL frame 70 from the first input port P11 to the third frame conversion unit 16. The third frame conversion unit 16 removes the external Ethernet header 71 in the transmission type TRILL frame 70 and defragments the fragments to covert the transmission type TRILL frame 70 into a TRILL frame 60. Then, the third frame conversion unit 16 outputs the TRILL frame 60 from the first output port P12. As a result, the TRILL SW 3C may relay the TRILL frame 60 in the transmission type TRILL frame 70.

Figure 9:
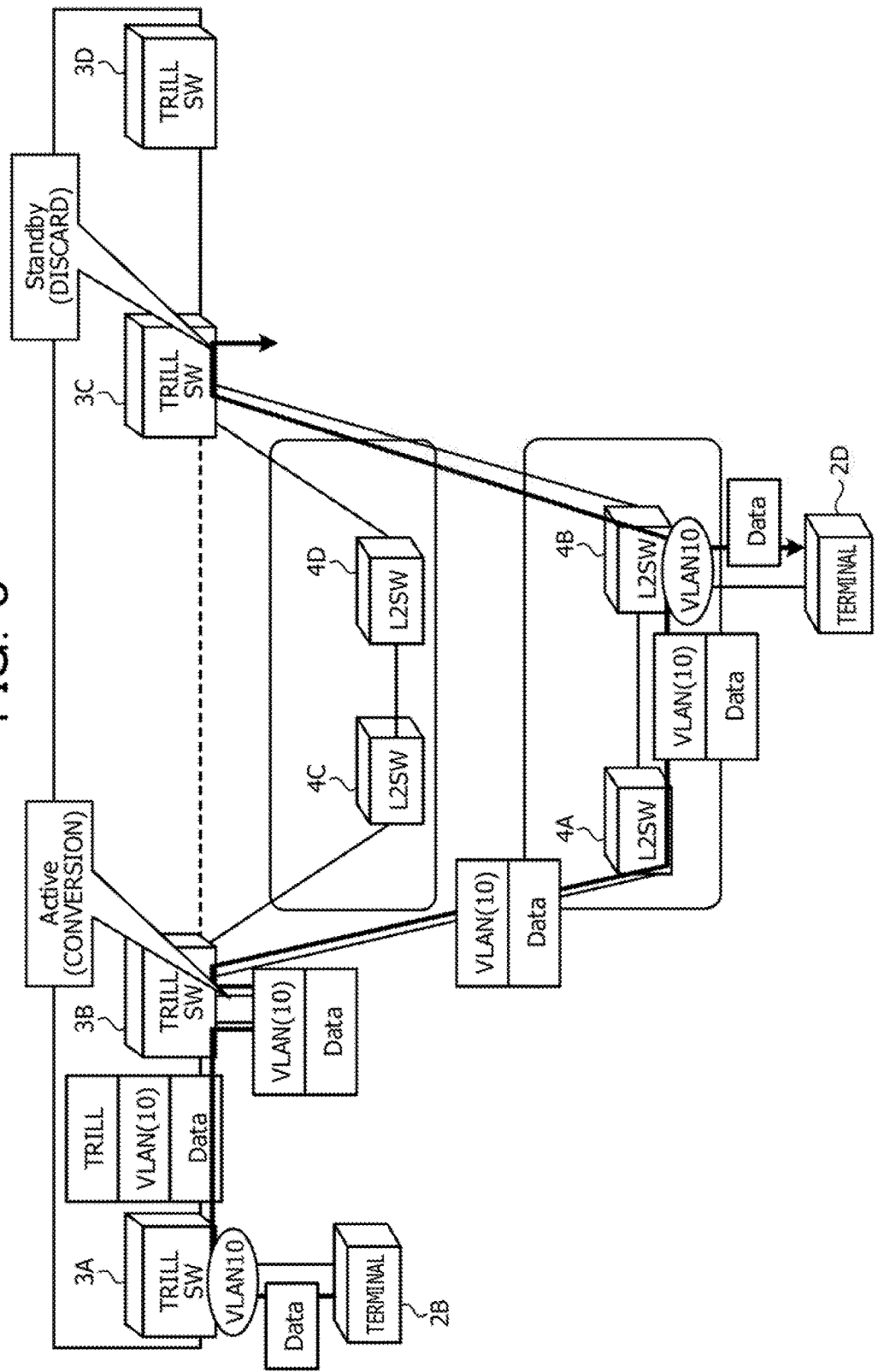
FIG. 9 is an explanatory view illustrating an example of a transfer type TRILL relaying process.

FIG. 9 is an explanatory view illustrating an example of a transfer type TRILL relaying process. It is to be noted that it is assumed that the TRILL SW 3B is in an active state with respect to the L2 SW 4A and the TRILL SW 3C is in a standby state (discard) with respect to the L2 SW 4B. If the TRILL SW 3A depicted in FIG. 9 receives data destined for the terminal 2D from the terminal 2B, the TRILL SW 3A converts the data destined for the terminal 2D into a TRILL frame 60 and relays the TRILL frame 60 to the TRILL SW 3B.

If the TRILL SW 3B receives the TRILL frame 60 destined for the terminal 2D, the TRILL SW 3B identifies the TRILL frame 60, based on the destination information in the TRILL frame 60, as a frame destined for the terminal 2D subordinate to the L2 SW 4B in the Ethernet. As a result, the TRILL SW 3B removes the TRILL header 61 of the TRILL frame 60 to convert the TRILL frame 60 into an Ethernet frame 50 and relays the Ethernet frame 50 obtained by the conversion to the L2 SW 4A.

The L2 SW 4A transmits the Ethernet frame 50 destined for the terminal 2D to the L2 SW 4B. Further, when the L2 SW 4B receives the Ethernet frame 50, the L2 SW 4B relays the received Ethernet frame 50 to the terminal 2D.

Figure 10:
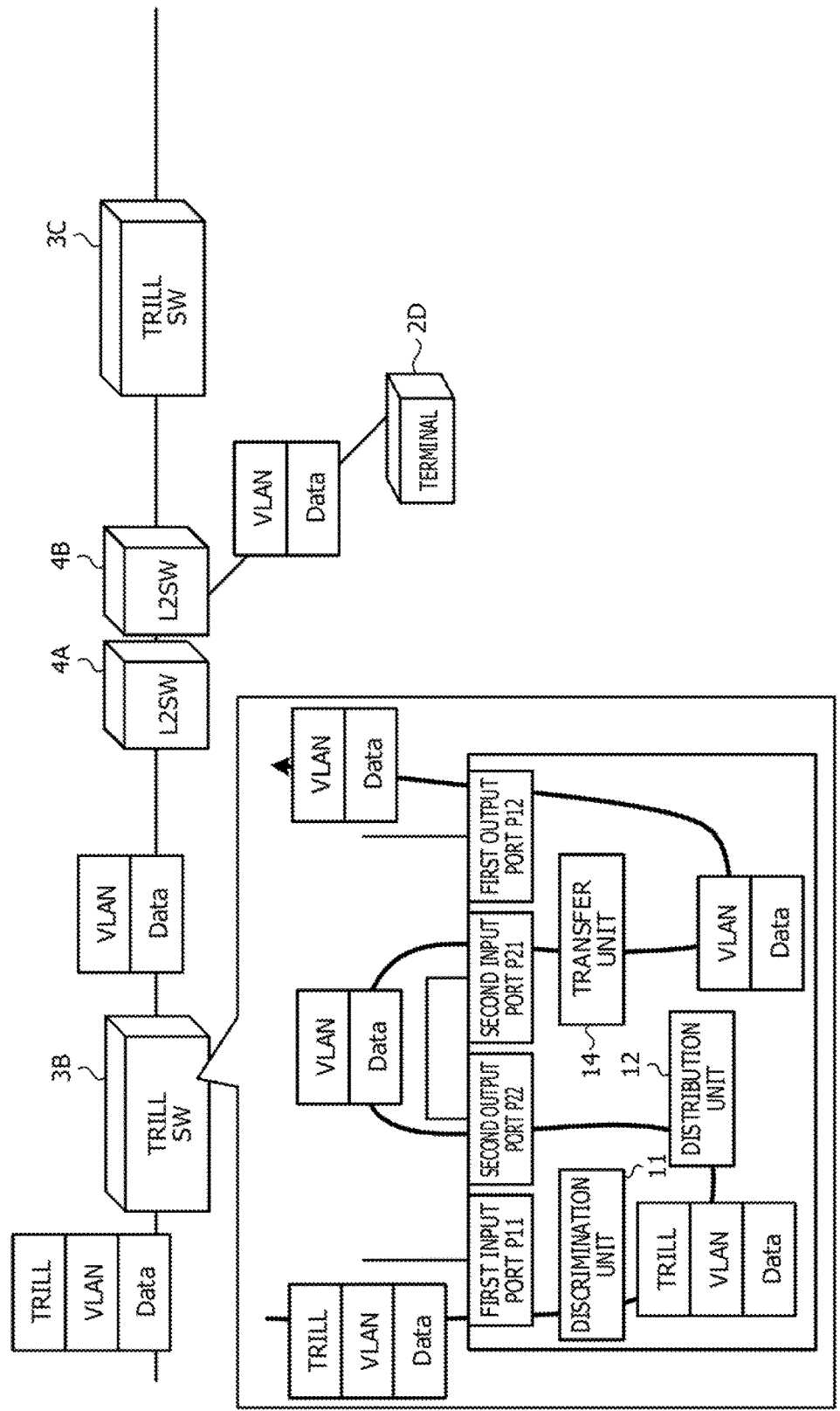
FIG. 10 is an explanatory view illustrating an example of operation in each TRILL SW relating to a transfer type TRILL relaying process.

FIG. 10 is an explanatory view illustrating an example of operation of the TRILL SW 3B relating to a transfer type TRILL relaying process. If a TRILL frame 60 is received from the first input port P11, the discrimination unit 11 in the TRILL SW 3B depicted in FIG. 10 discriminates destination information in and a frame type of the received TRILL frame 60 and notifies the distribution unit 12 of a result of the discrimination. It is to be noted that the destination information is information of the terminal 2D subordinate to the L2 SW 4B. The distribution unit 12 distributes, based on the result of the discrimination, the TRILL frame 60 from the first input port P11 to the second output port P22. Further, since the second output port P22 outputs the TRILL frame 60, the TRILL SW 3B removes the TRILL header 61 from the TRILL frame 60 to convert the TRILL frame 60 into an Ethernet frame 50 and inputs the Ethernet frame 50 to the second input port P21. Further, the transfer unit 14 transfers the Ethernet frame 50 inputted from the second input port P21 to the first output port P12 so as to be outputted from the first output port P12. As a result, the TRILL SW 3B may relay the Ethernet frame 50 obtained by removing the TRILL header 61 from the TRILL frame 60 to the L2 SW 4A.

In order to output the TRILL frame 60 received at the first input port P11 to the second output port P22, the TRILL SW 3 removes the TRILL header 61 in the TRILL frame 60. Then, the TRILL SW 3 transfers the Ethernet frame 50 after the removal of the TRILL header 61 to the first output port P12 so as to be outputted from the first output port P12. As a result, the L2 SW 4 may relay the data in the TRILL frame 60 to the terminal 2 subordinate to the Ethernet.

The TRILL SW 3 encapsulates the TRILL frame 60 received at the first input port P11 with the external Ethernet header 71 and outputs a resulting transmission type TRILL frame 70 to the first output port P12. As a result, the L2 SW 4 may relay the TRILL frame 60 using the transmission type TRILL frame 70.

The TRILL SW 3 removes the external Ethernet header 71 from the transmission type TRILL frame 70 received at the first input port P11 and outputs the TRILL frame 60 after the removal of the external Ethernet header 71 to the first output port P12. As a result, the TRILL SW 3 may relay the data of the TRILL frame 60 in the transmission type TRILL frame 70.

In the data relaying system 1 of the working example 1, when a wide-area mesh network is to be constructed, in a station that may not require a switching function, for example, for three ways, four ways or the like, the L2 SWs 4 that are less expensive may be disposed without using the TRILL SWs 3 that are expensive. As a result, the compatibility between different protocols may be secured at a low cost.

Figure 11:
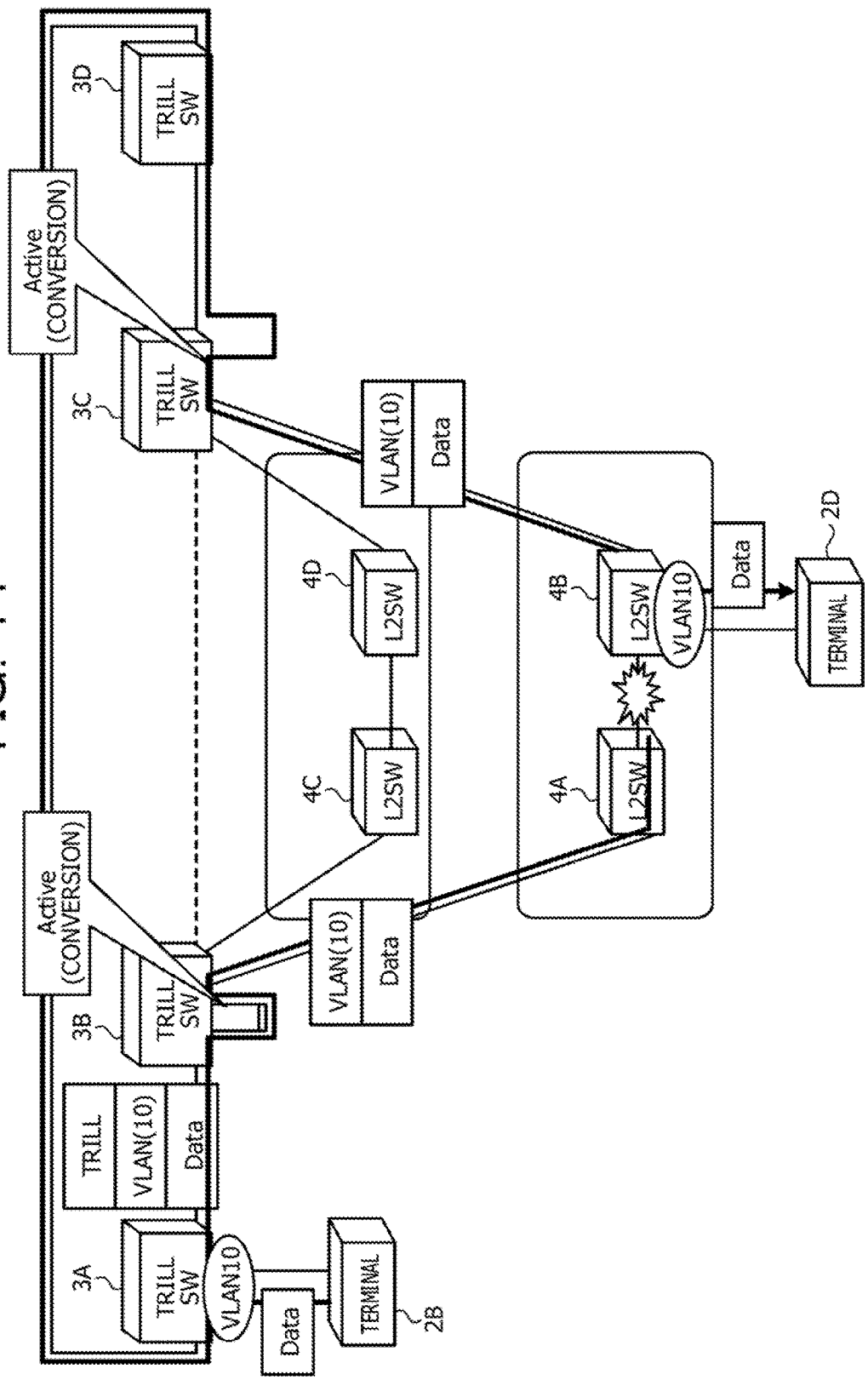
FIG. 11 is an explanatory view illustrating an example of a transfer type TRILL relaying process when a failure occurs.

FIG. 11 is an explanatory view illustrating an example of a transfer type TRILL relaying process when a failure occurs. It is to be noted that it is assumed that the TRILL SW 3B is set to an active state with respect to the L2 SW 4A and the TRILL SW 3C is set to a standby state (discard) with respect to the L2 SW 4B. Then, if a failure occurs between the L2 SW 4A and the L2 SW 4B during such setting, the TRILL SW 3C is set to an active state with respect to the L2 SW 4B. In this case, the TRILL SW 3A converts data destined for the terminal 2D from the terminal 2B into a TRILL frame 60 and transmits the TRILL frame 60 to the TRILL SW 3D. The TRILL SW 3D relays the received TRILL frame 60 to the TRILL SW 3C. The TRILL SW 3C removes the TRILL header 61 from the received TRILL frame 60 to convert the TRILL frame 60 into an Ethernet frame 50. Then, the TRILL SW 3C relays the Ethernet frame 50 obtained by the conversion to the L2 SW 4B. Then, the L2 SW 4B relays the Ethernet frame 50 to the terminal 2D. As result, also when a failure occurs between the L2 SW 4A and the L2 SW 4B, data may be relayed to the terminal 2D through the TRILL SW 3A, the TRILL SW 3D, the TRILL SW 3C, to the L2 SW 4B.

It is to be noted that, when the frame length of the transmission type TRILL frame 70 exceeds a maximum transmission frame length, the TRILL SW 3 fragments data of the payload in the transmission type TRILL frame 70. However, when the frame length of the transmission type TRILL frame 70 does not exceed the maximum transmission frame length, the TRILL SW 3 does not fragment the data of the payload in the transmission type TRILL frame 70.

In the data relaying system 1, the TRILL SWs 3 that relay a TRILL frame 60 are exemplified, and a case in which the TRILL frame 60 is converted into a transmission type TRILL frame 70 and another case in which the TRILL frame 60 is converted into an Ethernet frame 50 are exemplified.

However, the data relaying system 1 is not limited to TRILL, for example, also may be applied to SPB. In this case, an embodiment of a data relaying system 1A in which an SPB SW 5 that relays an SPB frame is used in place of the TRILL SW 3 is described below as a working example 2.

Working Example 2

Figure 12:
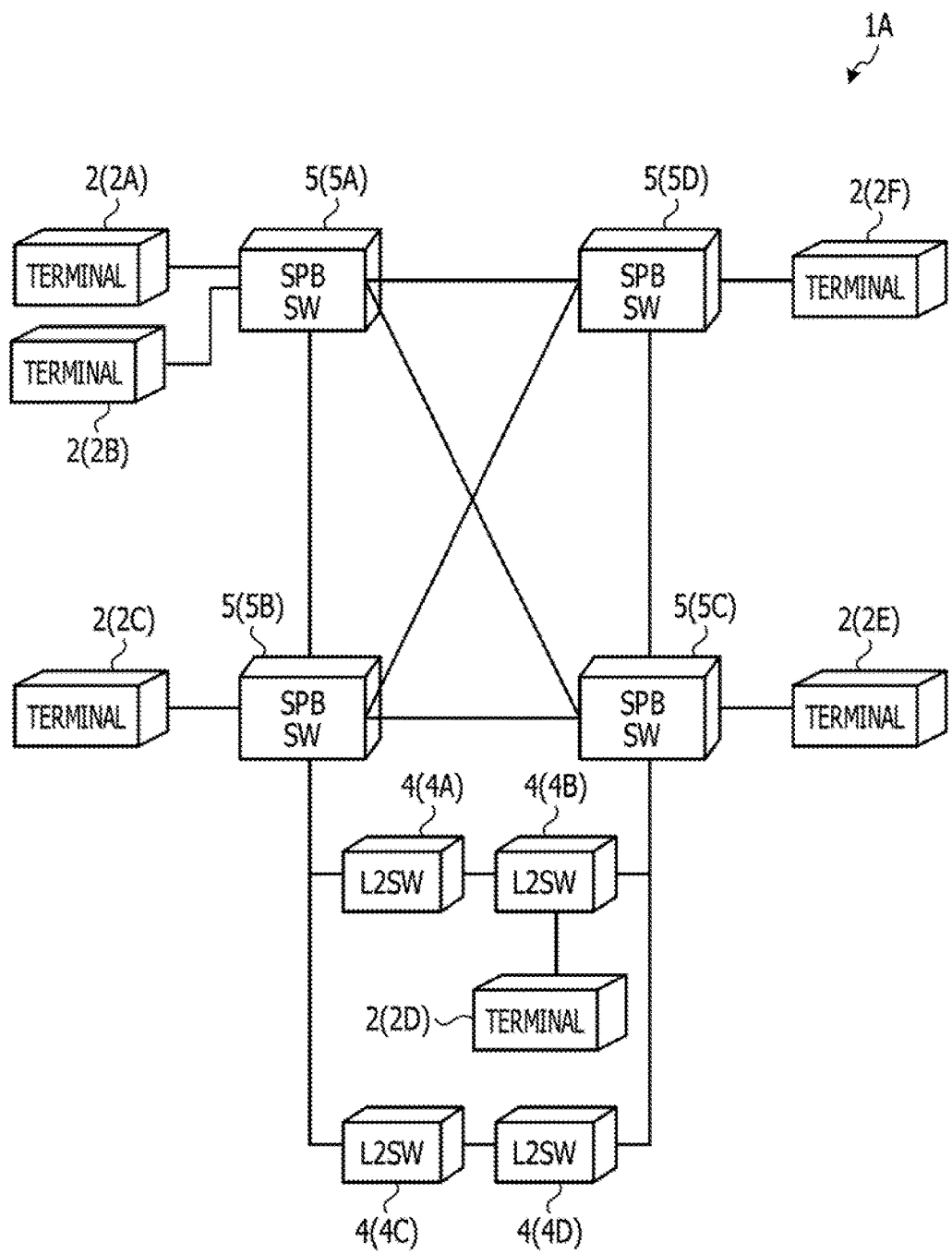
FIG. 12 is an explanatory view depicting an example of a data relaying system of a working example 2.

FIG. 12 is an explanatory view depicting an example of the data relaying system 1A of the working example 2. It is to be noted that the same elements to those of the data relaying system 1 of the working example 1 are denoted by the same reference symbols and overlapping description of the components and operation of them is omitted therein.

The data relaying system 1A depicted in FIG. 12 is different from the data relaying system 1 depicted in FIG. 1 in that SPB is used in place of TRILL and SPB SWs 5 are used in place of the TRILL SWs 3. As the SPB SWs 5, for example, four SPB SWs 5A to 5D are provided. It is assumed that each SPB SW 5 in the data relaying system 1 is disposed, for example, in an urban area while each L2 SW 4 is disposed at a deserted place such as in a remote island, in a mountainous region or the like.

Figure 13:
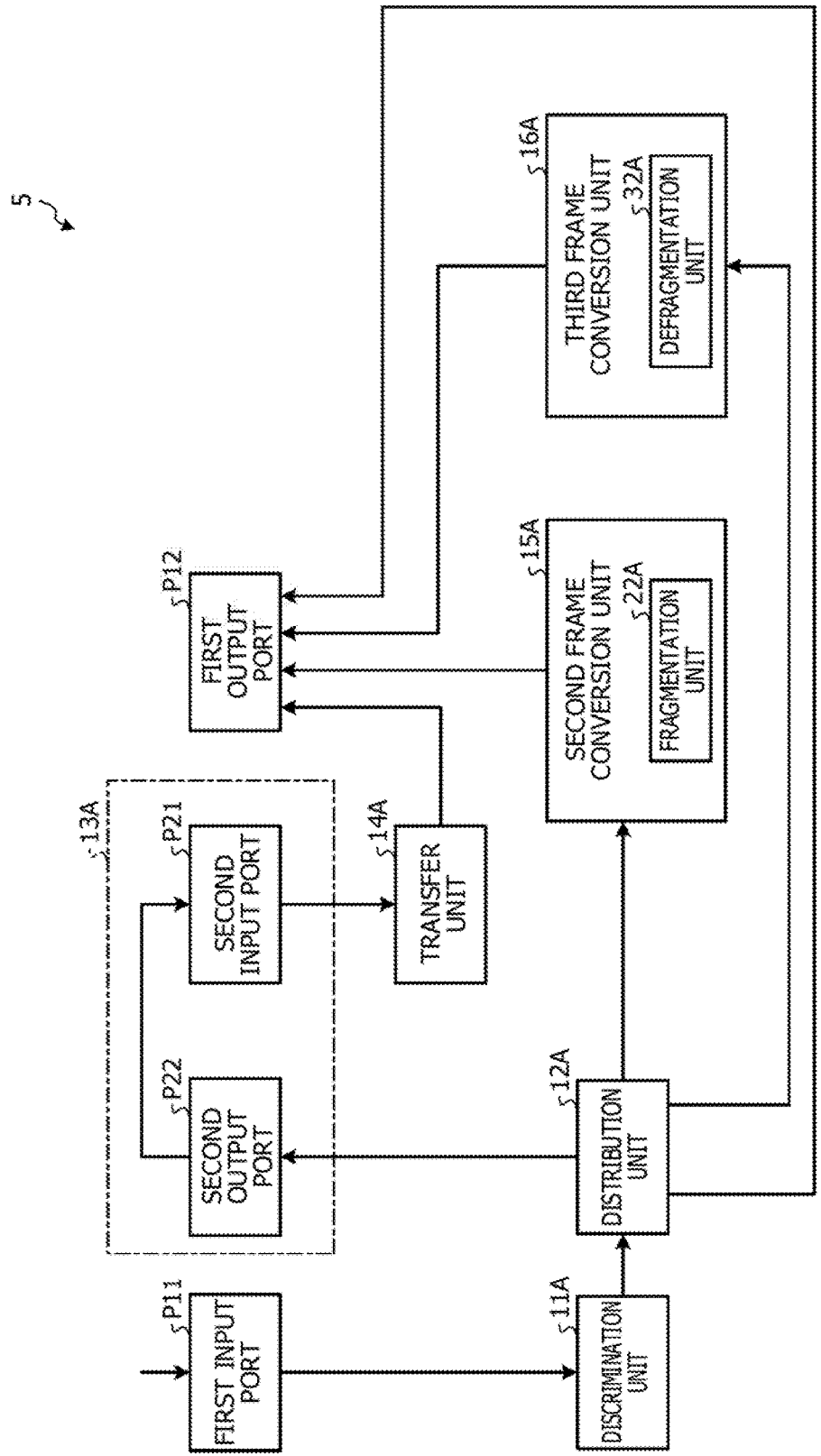
FIG. 13 is a block diagram depicting an example of a configuration of an SPB SW.

FIG. 13 is a block diagram depicting an example of a configuration of each SPB SW 5. The SPB SW 5 depicted in FIG. 13 includes a discrimination unit 11A, a distribution unit 12A, a first frame conversion unit 13A, a transfer unit 14A, a second frame conversion unit 15A, and a third frame conversion unit 16A.

The discrimination unit 11A extracts destination information in or header information of a received frame and discriminates a frame type based on the header information in the received frame. It is to be noted, as the frame type, there are an Ethernet frame 50, an SPB frame 90, and a transmission type SPB frame 100 hereinafter described.

Figure 14:
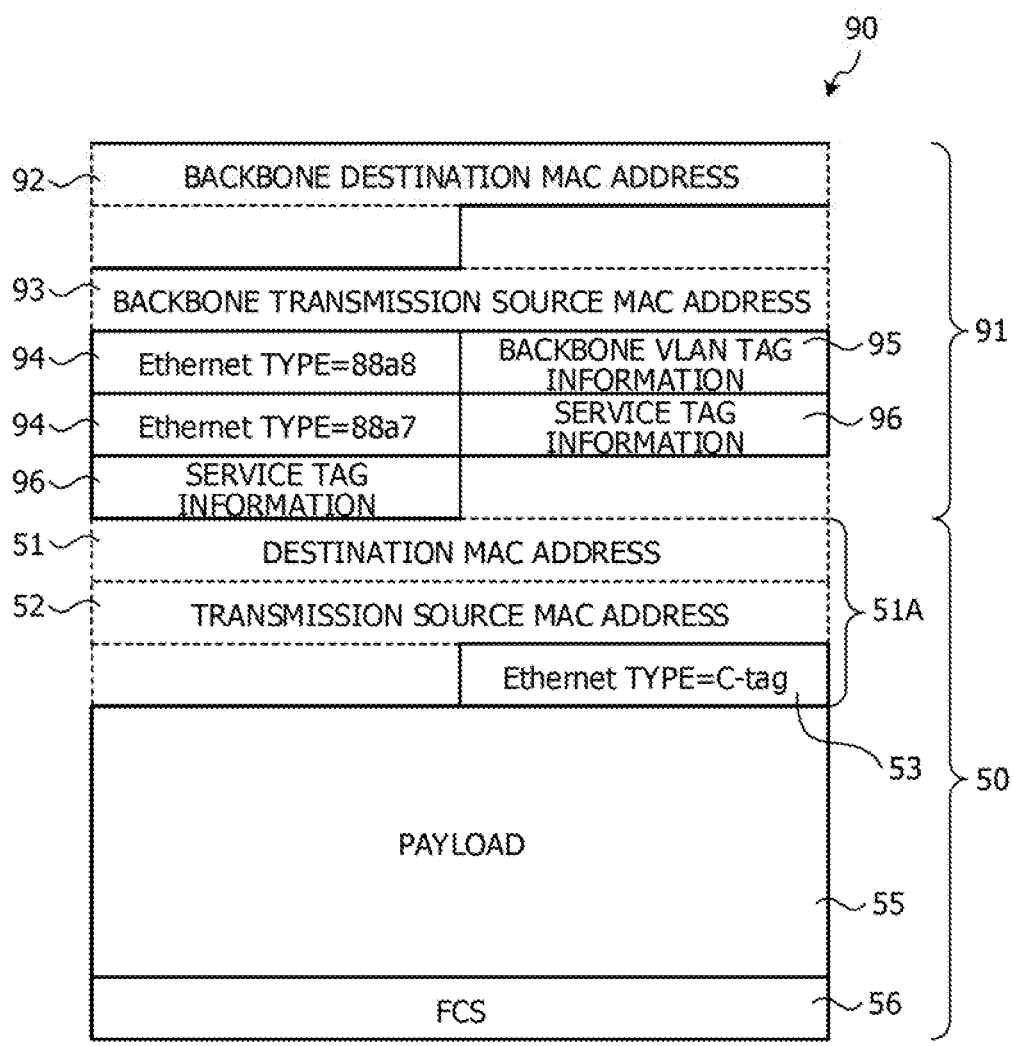
FIG. 14 is an explanatory view illustrating an example of a format configuration of an SPB frame.

FIG. 14 is an explanatory view illustrating an example of a format configuration of the SPB frame 90. The SPB frame 90 illustrated in FIG. 14 is configured by adding an SPB header 91 to an Ethernet frame 50. The SPB header 91 includes a backbone destination MAC address 92, a backbone transmission source MAC address 93, an Ethernet type 94, backbone VLAN tag information 95, and service tag information 96. The backbone destination MAC address 92 is a region for storing a MAC address of a destination of the frame. The backbone transmission source MAC address 93 is a region for storing a MAC address of a transmission source of the frame. The Ethernet type 94 is a region for storing an identifier for identifying a type of the frame. The backbone VLAN tag information 95 is a region for storing a VLAN tag for exclusive use for SPB.

The distribution unit 12A distributes, where a received frame is an SPB frame 90 without through the Ethernet based on a result of the discrimination by the discrimination unit 11A, the SPB frame 90 to the first output port P12. The distribution unit 12A distributes, where the received frame is an SPB frame 90 destined for a terminal 2 subordinate to the Ethernet at the succeeding stage based on a result of the discrimination by the discrimination unit 11A, the SPB frame 90 to the second output port P22. The distribution unit 12A distributes, where the received frame is an SPB frame 90 destined for a terminal 2 subordinate to the SPB through the Ethernet based on a result of the discrimination by the discrimination unit 11A, the SPB frame 90 to the second frame conversion unit 15A. The distribution unit 12A distributes, where the received frame is a transmission type SPB frame 100 based on a result of the discrimination by the discrimination unit 11A, the transmission type SPB frame 100 to the third frame conversion unit 16A.

The first frame conversion unit 13A converts an SPB frame 90 into an Ethernet frame 50 by removing the SPB header 91 in the SPB frame 90. It is to be noted that the first frame conversion unit 13A is configured by coupling the second output port P22 and the second input port P21. The first frame conversion unit 13A outputs the received SPB frame 90 from the second output port P22 to remove the SPB header 91 from the SPB frame 90 thereby to form an Ethernet frame 50. Further, the first frame conversion unit 13A inputs the Ethernet frame 50 after the removal of the SPB header 91 outputted from the second output port P22 to the second input port P21 so as to be transferred to the transfer unit 14A. The transfer unit 14A transfers the Ethernet frame 50 inputted to the second input port P21 to the first output port P12 so as to be outputted from the first output port P12.

The second frame conversion unit 15A fragments data in the SPB frame 90 to convert the SPB frame 90 into a transmission type SPB frame 100. The second frame conversion unit 15A includes a fragmentation unit 22A. It is to be noted that the frame length of the SPB frame 90 sometimes becomes, for example, equal to or greater than 1522 bytes because the SPB header 91 of 22 bytes is added to the Ethernet frame 50.

The fragmentation unit 22A decides whether or not the frame length of the transmission type SPB frame 100 exceeds a maximum transmission frame length of the L2 SW 4. It is to be noted that the maximum transmission frame length is 1500 bytes. When the frame length of the transmission type SPB frame 100 does not exceed the maximum transmission frame length of the L2 SW 4, the fragmentation unit 22A outputs the transmission type SPB frame 100 from the first output port P12. On the other hand, when the frame length of the transmission type SPB frame 100 exceeds the maximum transmission frame length of the L2 SW 4, the fragmentation unit 22A divides the data of the payload 55 in the transmission type SPB frame 100.

Figure 15:
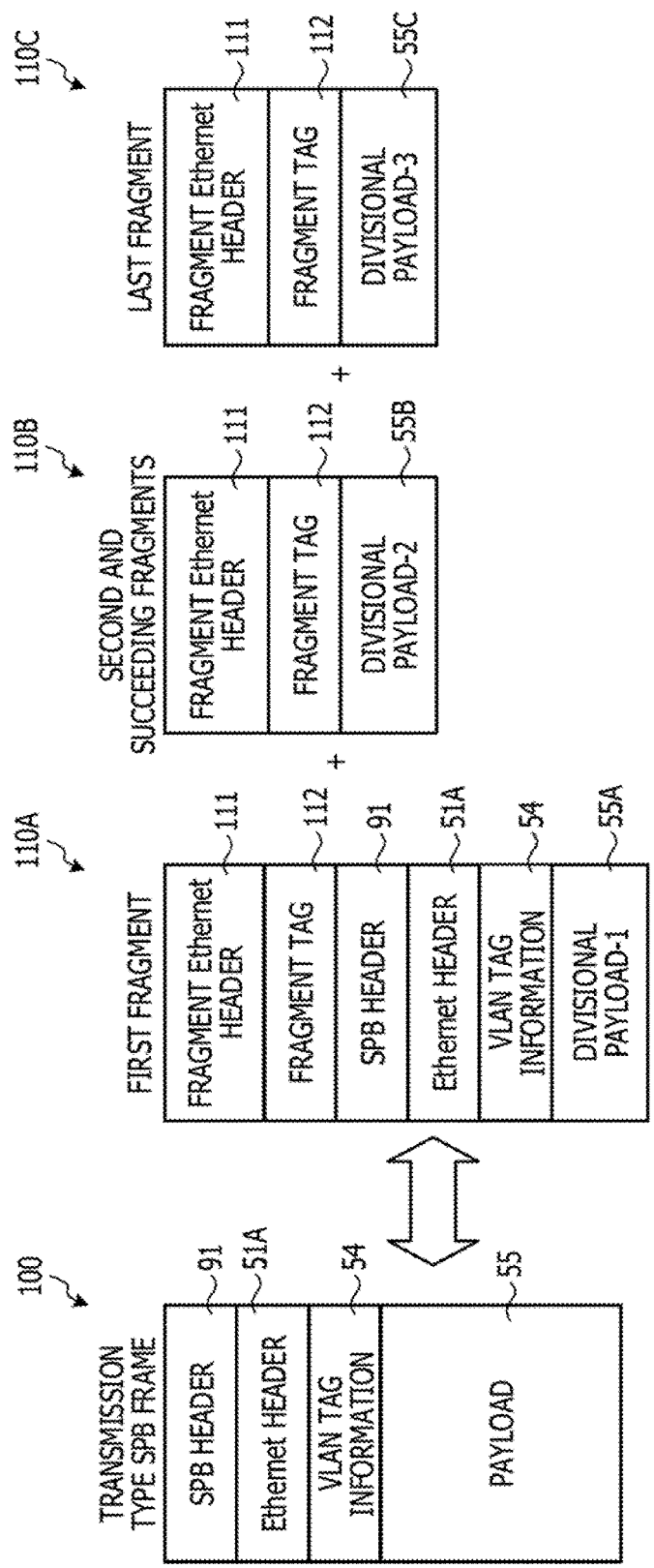
FIG. 15 is an explanatory view illustrating an example of a fragment process for a transmission type SPB frame.

FIG. 15 is an explanatory view illustrating an example of operation of the fragmentation unit 22A. The fragmentation unit 22A divides data in the payload 55 in the transmission type SPB frame 100 into a plurality of fragments 110A to 110C. The first fragment 110A includes a fragment Ethernet header 111 and a fragment tag 112. Further, the fragment 110A includes an SPB header 91, an Ethernet header 51A, VLAN tag information 54, and a divisional payload 55A. The fragment Ethernet header 111 is a region for storing an identifier for identifying that the fragment 110A is a fragment of the transmission type SPB frame 100. The fragment tag 112 is a region for storing a tag for identifying that the fragment 110A is a fragment of a transmission type SPB frame unit. The second and succeeding fragments 110B include a fragment Ethernet header 111, a fragment tag 112, and a divisional payload 55B. The last fragment 110C includes a fragment Ethernet header 111, a fragment tag 112, and a divisional payload 55C. It is to be noted that the fragment tag 112 in the fragments 110A to 110C is an identifier for identifying that the data is of the same payload.

The third frame conversion unit 16A defragments the fragments in the transmission type SPB frame 100 to convert the transmission type SPB frame 100 into an SPB frame 90. The third frame conversion unit 16A includes a defragmentation unit 32A. The defragmentation unit 32A refers to the fragment tag 112 in the transmission type SPB frame 100 to defragment the divisional payloads 55A to 55C of each of the fragments 110A to 110C. Then, the defragmentation unit 32A converts the transmission type SPB frame 100 into an SPB frame 90 by defragmenting each of the fragments and outputs the SPB frame 90 to the first output port P12.

Figure 16:
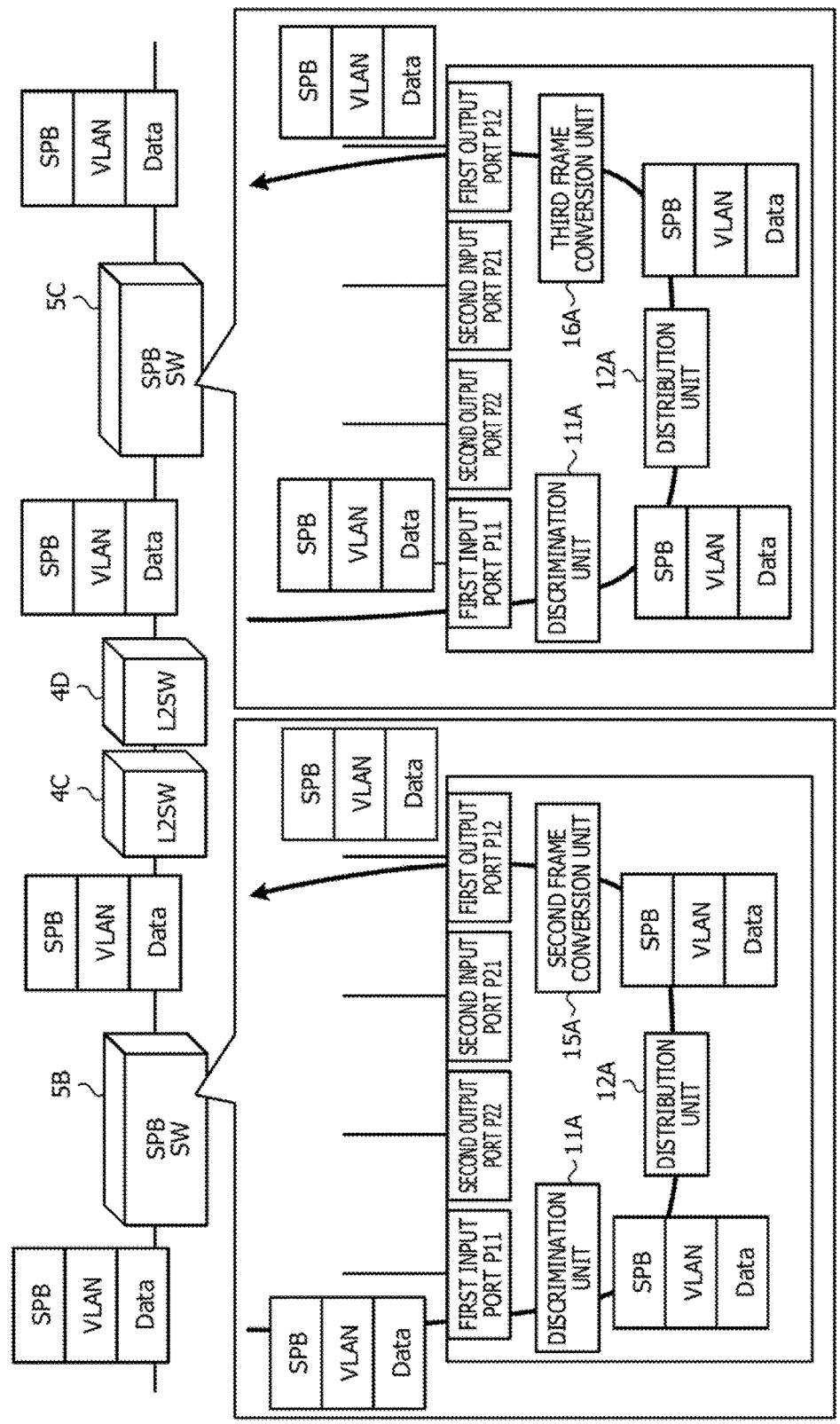
FIG. 16 is an explanatory view illustrating an example of operation in each SPB SW relating to a transmission type SPB relaying process.

FIG. 16 is an explanatory view illustrating an example of operation in the SPB SWs 5B and 5C relating to a transmission type SPB relaying process. If the discrimination unit 11A in the SPB SW 5B depicted in FIG. 16 receives an SPB frame 90 from the first input port P11, the discrimination unit 11A discriminates address information in and a frame type of the received SPB frame 90 and notifies the distribution unit 12A of a result of the discrimination. It is to be noted that it is assumed that the destination information is destined for the terminal 2F through the Ethernet. The distribution unit 12A distributes the SPB frame 90 from the first input port P11 to the second frame conversion unit 15A. The second frame conversion unit 15A fragments the data in the SPB frame 90 to convert the SPB frame 90 into a transmission type SPB frame 100. Then, the second frame conversion unit 15A outputs the transmission type SPB frame 100 from the first output port P12. As a result, the L2 SW 4 may relay the SPB frame 90 using the transmission type SPB frame 100.

Further, if the discrimination unit 11A in the SPB SW 5C receives a transmission type SPB frame 100 from the first input port P11, the discrimination unit 11A discriminates destination information in and a frame type of the received transmission type SPB frame 100 and notifies the distribution unit 12A of a result of the discrimination. The distribution unit 12A distributes the transmission type SPB frame 100 from the first input port P11 to the third frame conversion unit 16A. The third frame conversion unit 16A defragments the fragments (divisional payloads) in the transmission type SPB frame 100 to convert the transmission type SPB frame 100 into an SPB frame 90. Then, the third frame conversion unit 16A outputs the SPB frame 90 from the first output port P12. As a result, the SPB SW 5C may relay the SPB frame 90 in the transmission type SPB frame 100.

Figure 17:
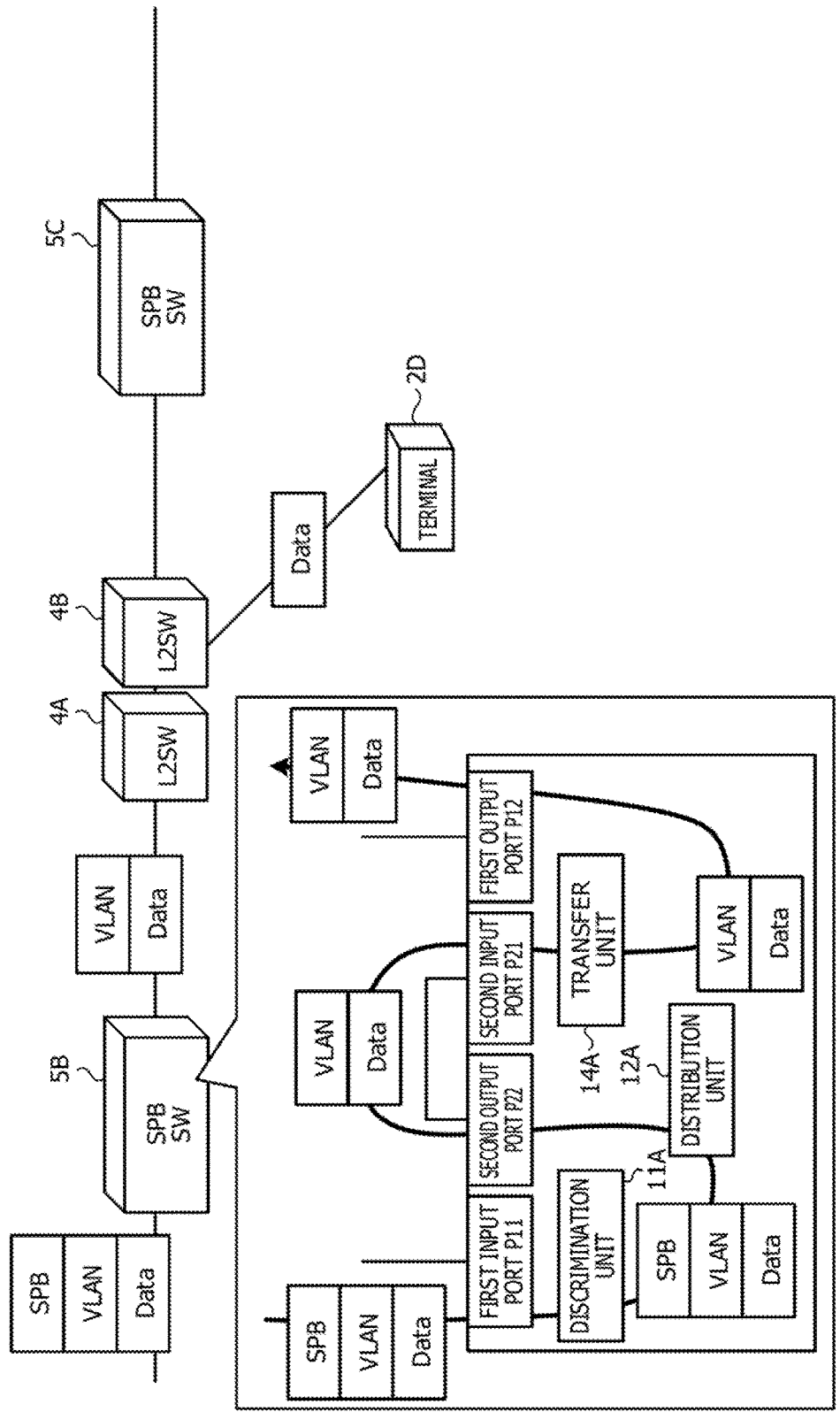
FIG. 17 is an explanatory view illustrating an example of operation in each SPB SW relating to a transfer type SPB relaying process.

FIG. 17 is an explanatory view depicting an example of operation of the SPB SW 5B relating to a transfer type SPB relaying process. If the discrimination unit 11A in the SPB SW 5B depicted in FIG. 17 receives an SPB frame 90 from the first input port P11, the discrimination unit 11A discriminates destination information in and a frame type of the received SPB frame 90 and notifies the distribution unit 12A of a result of the discrimination. It is to be noted that the destination information is information of the terminal 2D subordinate to the L2 SW 4B. The distribution unit 12A distributes, based on the result of the discrimination, the SPB frame 90 from the first input port P11 to the second output port P22. Further, since the second output port P22 outputs the SPB frame 90, the SPB header 91 is removed from the SPB frame 90 to convert the SPB frame 90 into an Ethernet frame 50, and the Ethernet frame 50 is inputted to the second input port P21. Further, the transfer unit 14A transfers the Ethernet frame 50 inputted from the second input port P21 to the first output port P12 so as to be outputted from the first output port P12. As a result, the SPB SW 5B may relay the Ethernet frame 50 obtained by removing the SPB header 91 from the SPB frame 90 to the L2 SW 4.

In order to output the SPB frame 90 received at the first input port P11 to the second output port P22, the SPB SW 5 removes the SPB header 91 in the SPB frame 90 and transfers the Ethernet frame 50 after the removal to the first output port P12 so as to be outputted from the first output port P12. As a result, the L2 SW 4 may relay the data in the SPB frame 90 to the terminal 2 subordinate to the Ethernet.

The SPB SW 5 fragments the data (payload) in the SPB frame 90 received at the first input port P11 to convert the SPB frame 90 into a transmission type SPB frame 100. Then, the SPB SW 5 outputs the transmission type SPB frame 100 after the conversion to the first output port P12. As a result, the L2 SW 4 may relay the data of the SPB frame 90 using the transmission type SPB frame 100.

The SPB SW 5 defragments the fragments in the transmission type SPB frame 100 received at the first input port P11 to convert the transmission type SPB frame 100 into an SPB frame 90 and outputs the SPB frame 90 after the conversion to the first output port P12. As a result, the SPB SW 5 may relay the data of the SPB frame 90 in the transmission type SPB frame 100.

While, in the working examples 1 and 2 described above, the TRILL SW 3 and the SPB SW 5 are exemplified, respectively, the embodiment of the present application may be applied also to a TRILL/SPB SW in which both of the TRILL and the SPB are used.

Further, each component of each element depicted in the figures may not necessarily be configured physically in such a manner as depicted in the figures. For example, particular forms of disintegration and integration of each element are not limited to those depicted in the figures, and all or part of them may be functionally or physically disintegrated or integrated in an arbitrary unit in response to various loads, use situations and so forth.

Further, the various processing functions performed by each apparatus may be entirely or partly executed on a central processing unit (CPU), a digital signal processor (DSP), a field programmable gate array (FPGA) or the like. Further, the various processing functions may be entirely or partly executed on a program that is analyzed and executed by a CPU or the like or on hardware by wired logics.

The areas for storing various kinds of information may be configured, for example, from a read only memory (ROM) or from a random access memory (RAM) such as a synchronous dynamic random access memory (SDRAM), a magnetoresistive random access memory (MRAM), or a non volatile random access memory (NVRAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data relaying apparatus, comprising:
   a first input port configured to receive a data frame corresponding to a first communication protocol;
   a first output port;
   a memory; and
   a processor coupled to the memory and configured to:
      when a destination of the data frame received by the first input port is a first information processing apparatus provided in a first network in which transferring processes are executed in accordance with a second communication protocol, perform a first process including removing first header information of the data frame and transmitting, via the first output port, the data frame from which the first header information is removed, the first header information being a first communication protocol header information for the first communication protocol, and the data frame received by the first input port being converted into a data frame corresponding to the second communication protocol by removing the first communication protocol header information, and when the destination of the data frame received by the first input port is a second information processing apparatus provided in a second network in which transferring processes are executed in accordance with the first communication protocol and the data frame is to be transmitted to the second information processing apparatus through the first network, perform a second process including adding second header information to the data frame received by the first input port and transmitting, via the first output port, the data frame to which the second header information is added, the second header information being second communication protocol header information for the second communication protocol, and the data frame received by the first input port being converted into the data frame corresponding to the second communication protocol by adding the second communication protocol header information.

2. The data relaying apparatus according to claim 1, wherein the first communication protocol is Transparent Interconnection of Lots of Links (TRILL) and the second communication protocol is Ethernet.

3. The data relaying apparatus according to claim 2, wherein the processor is further configured to:
when the data frame received by the first input port is an Ethernet frame with the second header information, remove the second header information from the data frame, and
transmit, via the first output port, the data frame from which the second header information is removed.

4. The data relaying apparatus according to claim 1, wherein the processor is further configured to: when the destination of the data frame is the second information processing apparatus and the data frame is to be transmitted to the second information processing apparatus without through the first network, transmit, via the first output port, the data frame received by the first input port without performing any of the first process and the second process on the data frame received by the first input port.

5. The data relaying apparatus according to claim 1, further comprising:
a second output port; and
a second input port,
wherein
the processor is further configured to transmit, to the second output port, the data frame received by the first input port when the first process is selected,
the second output port is configured to transfer, to the second input port, the data frame from which the first header information is removed, and
the second input port is configured to transfer, to the first output port, the data frame from which the first header information is removed.

6. A method of relaying data, comprising:
receiving, by a first input port, a data frame corresponding to a first communication protocol;
performing, when a destination of the data frame received by the first input port is a first information processing apparatus provided in a first network in which transferring processes are executed in accordance with a second communication protocol, based on a destination of the data frame received by the first input port, a first process including removing first header information of the data frame and transmitting, via a first output port, the data frame from which the first header information is removed, the first header information being a first communication protocol header information for the first communication protocol, and the data frame received by the first input port being converted into a data frame corresponding to the second communication protocol by removing the first communication protocol header information; and performing, when the destination of the data frame received by the first input port is a second information processing apparatus provided in a second network in which transferring processes are executed in accordance with the first communication protocol and the data frame is to be transmitted to the second information processing apparatus through the first network, perform a second process including adding second header information to the data frame received by the first input port and transmitting, via the first output port, the data frame to which the second header information is added, the second header information being a second communication protocol header information for the second communication protocol, the data frame received by the first input port being converted into the data frame corresponding to the second communication protocol by adding the second communication protocol header information.

7. The method according to claim 6, wherein the first communication protocol is Transparent Interconnection of Lots of Links (TRILL) and the second communication protocol is Ethernet.

8. The method according to claim 7, further comprising:
when the data frame received by the first input port is an Ethernet frame with the second header information, removing, by the processor, the second header information from the data frame; and
transmitting, by the processor, via the first output port, the data frame from which the second header information is removed.

9. The method according to claim 6, further comprising:
when the destination of the data frame is the second information processing apparatus and the data frame is to be transmitted to the second information processing apparatus without through the first network, transmitting, by the processor, via the first output port, the data frame received by the first input port without performing any of the first process and the second process on the data frame received by the first input port.

10. The method according to claim 6, further comprising:
transmitting, by the processor, to a second output port, the data frame received by the first input port when the first process is selected;
transmitting, by the second output port, to a second input port, the data frame from which the first header information is removed; and
transmitting, by the second input port, to the first output port, the data frame from which the first header information is removed.

* * * * *